Nov. 9, 1965    O. W. PFEIFER ETAL    3,216,881
REINFORCEMENT OF LOWER DENSITY INORGANIC STRUCTURES
Filed Jan. 2, 1963    2 Sheets-Sheet 1
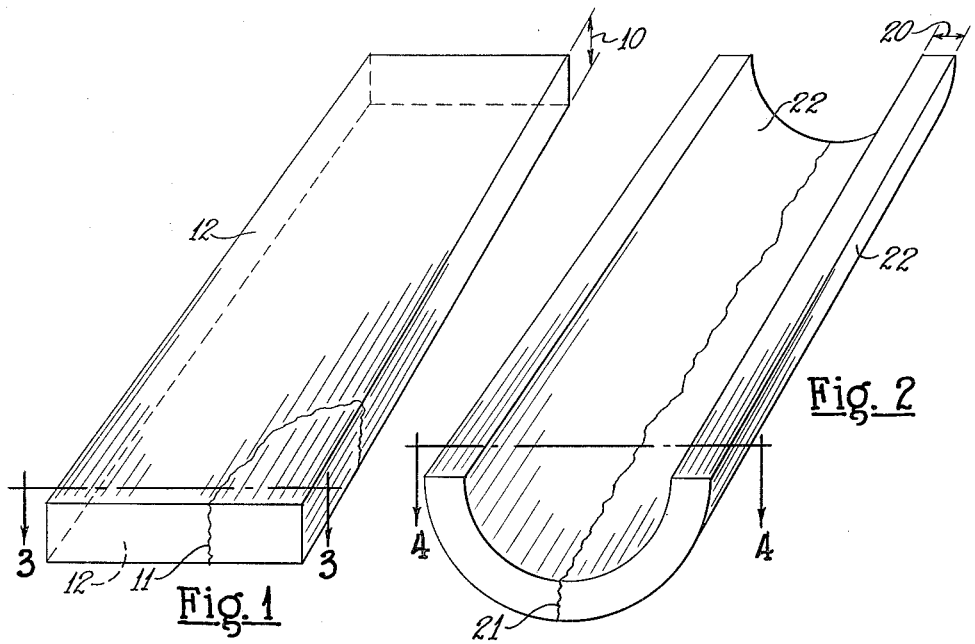
Fig. 1
Fig. 2
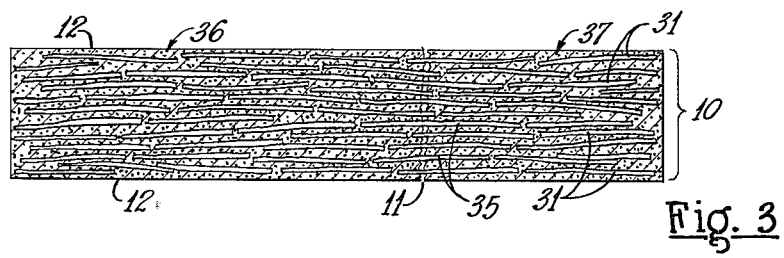
Fig. 3
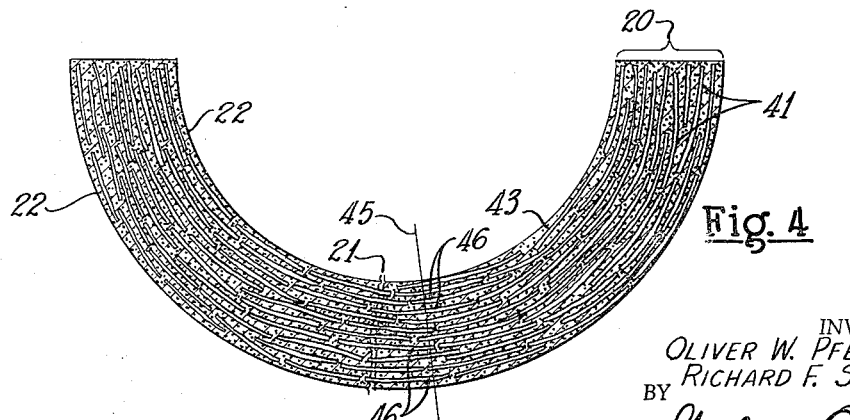
Fig. 4
INVENTORS
OLIVER W. PFEIFER &
RICHARD F. SHANNON
BY
ATTORNEYS Nov. 9, 1965     O. W. PFEIFER ETAL     3,216,881
REINFORCEMENT OF LOWER DENSITY INORGANIC STRUCTURES
Filed Jan. 2, 1963     2 Sheets-Sheet 2
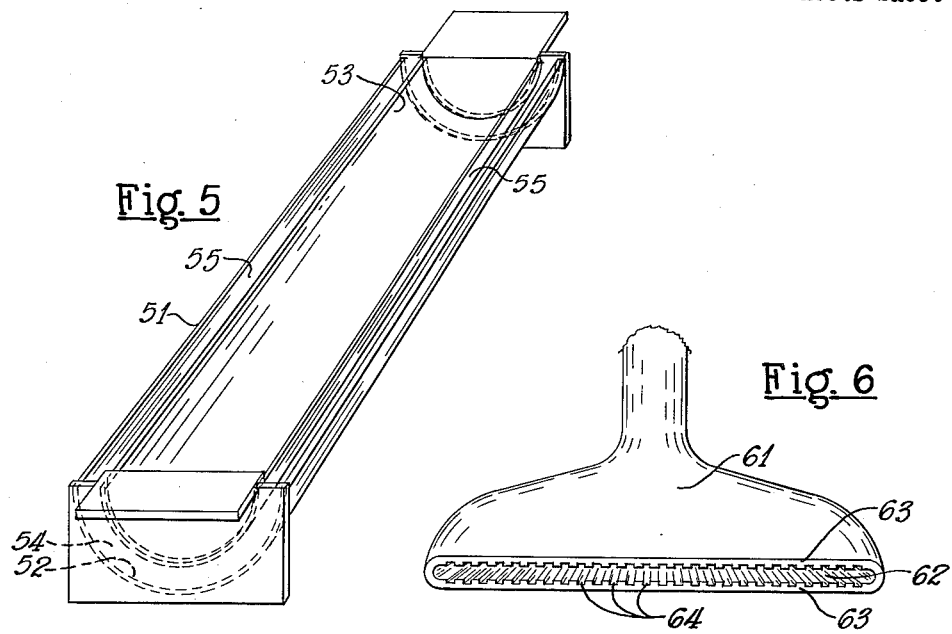
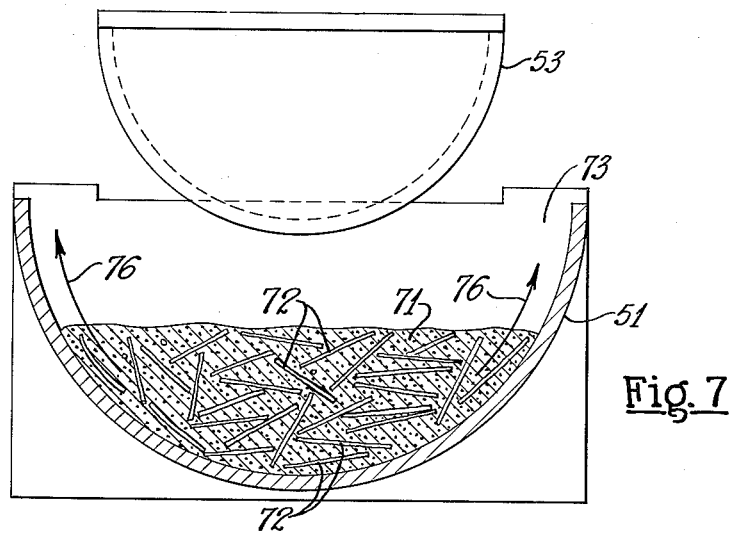
INVENTORS
OLIVER W. PFEIFER &
RICHARD F. SHANNON
BY
ATTORNEYS

United States Patent Office 3,216,881
Patented Nov. 9, 1965

3,216,881
REINFORCEMENT OF LOWER DENSITY
INORGANIC STRUCTURES
Oliver W. Pfeifer, Toledo, and Richard F. Shannon, Lancaster, Ohio, assignors to Owens-Corning Fiberglas Corporation, a corporation of Delaware
Filed Jan. 2, 1963, Ser. No. 248,955
5 Claims. (Cl. 161—60)

The present invention relates to low density, inorganic, insulating structures of improved strength and impact resistance, and particularly to structures of this type which comprise a continuous, hydrous calcium silicate matrix reinforced by fibrous glass strands.

The insulating materials described are formed by the direct union of CaO, $SiO_2$ and $H_2O$, and the nature of such products, as well as methods for their manufacture, are fully described by U.S. Patents Reissue 23,228; 2,547,127 and 2,748,008.

The utility of hydrous calcium silicates is particularly pronounced in the realm of high temperature insulation applications, i.e. 500–2000° F., wherein the combined properties of thermal resistance, low thermal transmission, low density, and the integrity of such insulating structures are substantially unique. The term "calcium silicate" as used throughout the specification and claims, is intended to connote a synthetic or synthesized, hydrous calcium silicate having a low density, i.e. the void volume being at least equal to the volume of the calcium silicate. Such void volume is the result of the synthesis process wherein the aqueous component passes off to leave the voids and a consequent, low density matrix. Such definition is employed to distinguish from naturally occurring, anhydrous, or high density calcium silicates such as, wollastonite, pseudowollastonite, lessingite, high density sand-lime bricks, etc.

However, despite the foregoing desirable properties, molded hydrous calcium silicate structures are plagued by the serious impediment of friability or low impact resistance. This defect results in the shattering of the molded structure, upon moderate impact. As a consequence, the processing, shipping and installation of such structures is attended by extensive waste in that it is uneconomical and impractical to reunite the shattered and separated elements once breakage is experienced.

It is an object of the present invention to provide hydrous calcium silicate structures having improved resistance to fragmentation upon impact.

It is a further object to provide a method for the preparation of hydrous calcium silicate structures having improved resistance to fragmentation upon impact.

Another object is the provision of elongate, arcuate hydrous calcium silicate structures which are resistant to fragmentation upon impact.

Certain aspects of the invention have been illustrated by the accompanying drawings in which:

FIGURES 1 and 2 are perspective views of types of structures which may be treated in accordance with the invention.

FIGURES 3 and 4 are cross-sectional views on the lines 3—3 and 4—4 of FIGURES 1 and 2 respectively, which depict the inventive reinforcements and the preferred orientation of the reinforcements.

FIGURE 5 is a perspective view of a mold which may be employed in the formation of the inventive structures.

FIGURE 6 is a perspective view of a pouring nozzle which may be utilized in the molding and reinforcement orientation of the invention, and FIGURE 7 is a cross sectional view of a mold which may be employed in the molding of the inventive structures.

The foregoing objects are achieved by means of the incorporation of reinforcing elements within the calcium silicate structure, and by the positioning or orientation of such reinforcements in relation to the structure to be reinforced.

Specifically, the calcium silicate matrix is reinforced with short lengths of fibrous glass strand which are coated with a composition which is resistant to the conditions of alkalinity, temperature, pressure, and moisture, which are inherent in the formation of the calcium silicate matrix. In one embodiment, the described reinforcements are subjected to a transverse orientation, in order to provide impact resistance in those regions where impact inspired fracturing is most commonly experienced, and most detrimental.

The magnitude of the problems involved, and the requisite properties of the coatings employed, is amply demonstrated by the fact that when uncoated glass fibers, or glass fibers coated with conventional sizes or coatings, are incorporated in a calcium silicate matrix, they are destroyed, and totally decomposed by the conditions inherent in such a matrix and in the processes necessary for its preparation.

It should be noted that the impact resistance imparted by the present invention, does not necessarily function to prevent fracturing, but does prevent or curtail fragmentation. By this it is meant that the reinforced calcium silicate matrix may be cracked or fractured but the loss of integrity of the matrix through fragmentation is prevented by the spanning or hinging effect of the reinforcements which span the fracture and interconnect the segments of the matrix on each side of the fracture. Such reinforcement is adequate since the structural and insulating properties of the calcium silicate structure are not seriously impaired by fractures, but the problem instead resides in a disintegration or fragmentation which prevents the installation of the structure. In the products of the present invention, a fracture may be sustained throughout one or more entire dimension of the structure and its utility is not lost since one structure, comprising a plurality of segments interconnected by the reinforcements of the invention, is still extant. However, in addition to rendering a calcium silicate structure useful once fracturing has occurred, the invention also imparts a resistance to the occurrence of fracturing, to the reinforced structure.

As previously stated, the coating composition utilized upon the fibrous glass reinforcing strands must be resistant to the conditions of alkalinity, temperature, pressure, and moisture which are present to the induration and formation of the calcium silicate structure. In this regard, the coating functions to protect the glass fibers from the degradation which would otherwise result from the described deleterious conditions. In fact, in the absence of such protection, the fibers are completely destroyed or decomposed by these conditions. In addition, the coatings may exert a function of structural integrity, in addition to their protective function. Specifically, even if the coating does serve to prevent the degradation of the fibers but is completely decomposed or undergoes extensive shrinkage during the performance of this function, it may prove inadequate since the reinforcements must be firmly retained or held by the matrix. If the coating does shrink or is decomposed, the annular void between the reinforcement and the matrix yields a condition wherein the reinforcement may be readily displaced or withdrawn from the matrix upon the occurrence of a fracture. Since one of the requisite functions of the reinforcements is the hinging, spanning and interconnection of abutting segments of the matrix, and resistance to displacement upon the application of longitudinal tension is necessary, therefore, it is apparent that the reinforcement or its coating must engage the matrix in order to yield adequate cohesion. It should be understood, that partial decomposition or transformation of the coating may be tolerated. For example the coating may be substantially carbonized without impairing its function and structural integrity, so long as adequate mechanical adhesion between the matrix and the carbonized coating is maintained. In addition, a non-thermoset coating material which is subject to shrinkage may be employed if a heat activatable blowing agent is employed. In such cases, the effects of shrinkage may be counteracted by the simultaneous expansion of the coating material as it is transformed to a cellular condition and fills the space between the reinforcement and the matrix. For example, a polyvinyl chloride coating containing entrained particles of zeolite or synthetic alumino-silicates with carbon dioxide absorbed thereon may be expanded in situ by the heat of the induration process. Still further, the effects of carbonization, decomposition or shrinkage may be overcome by an implementation of the mechanical bonding of the composite. Specifically, the coating may contain an inert additive such as grains of sand, which resist decomposition or transformation, and provide lateral projections which resist the displacement of the reinforcement upon the application of longitudinal tension. Similarly, nodules, droplets or knobs of the coating material enhance the mechanical bonding. For example, the application of an excess of coating material at spaced points upon the circumference of the reinforcement, provides a similar improvement in the bond. Still further, a strand of varying diameter may be utilized. Such strands, often referred to as "thick and thin" yarns, may contain the same number of filaments throughout their length, but the filaments are alternately compressed and displaced to yield a strand of varying diameter. The retention of this form is enhanced by the application of a coating material and the hardening thereof.

In addition to the utilization of the reinforcements of the invention, their utilization in an oriented form is of great benefit in the fabrication of structures of certain geometry. For example, the great majority of calcium silicate structures are prepared with two major surfaces and one minor dimension or thickness. Normally these structures take the form of slabs or hemi-cylinders having planar or arcuate, opposed major surfaces, respectively. The former are principally employed as cores for five doors while a plurality of the latter are utilized to encompass and insulate a cylindrical structure such as a pipe, duct or conduit. In the case of the slabs or flatware two of the dimensions are substantially greater than the minor dimension or thickness, and the same is true of the hemi-cylinders. As a consequence of the comparative thinness of these structures, fractures are commonly experienced in a plane parallel to their minor dimension and perperdicular to the opposed major surfaces. Accordingly, it is desirable to achieve a transverse orientation of the reinforcements, whereby they are substantially parallel to the opposed major surfaces of the structures, and consequently able to span fractures occurring in a plane parallel to the minor dimension. Such orientation, and methods for its achievement will be discussed in greater detail in a subsequent section of the present specification.

PREPARATION OF THE REINFORCEMENT

The strand employed as the basic reinforcement comprises a plurality of grouped, substantially parallel glass fibers and may be prepared by cutting a continuous fibrous glass strand into short segments. Such strand segments may be utilized in lengths of between 0.5–3 inches and preferably between 1.5–2 inches. In this regard it has been found that reinforcements having a length of less than 0.5 inch yield inadequate reinforcing value, while those having lengths greater than 3 inches are difficult to disperse throughout the calcium silicate slurry.

The diameter of the reinforcement is not particularly critical, although strands comprising 204–408 filaments with an average filament diameter of 0.00036 inch are preferred. However, yarns comprising a plurality of such strands are also highly satisfactory.

The quantity of coating material employed may range between 15–70% by weight of the total weight of glass fibers and coating composition. However, between 25–45% by weight of the coating material is preferred.

In respect to the quantity of the reinforcement to be employed in the calcium silicate, it has been found that between 3–5% by weight of reinforcement is preferred, based on the weight of dry solids in the batch, although between 0.5–15% may be utilized. In this regard, the greater the quantity of reinforcement employed, the greater is the difficulty in achieving the dispersion of the reinforcement. In addition, greater quantities of reinforcement result in snarling or entanglement which increase the difficulty of achieving adequate dispersion.

In respect to the nature of the coating material, such compositions may be defined as those materials which are capable of resisting the conditions of alkalinity, temperature, moisture and pressure which are experienced during the formation of the calcium silicate structure. The rigorousness of the conditions which must be withstood are readily apparent when one realizes that the calcium silicate structures are prepared by means of the direct union of $CaO$, $SiO_2$ and $H_2O$, in which the lime is reacted with silica to yield lime-rich calcium silicate gels having $CaO/SiO_2$ ratios in excess of unity, which in turn react with residual silica which is present in the mixture to provide an ultimate product having a lesser lime content. While it is clear that conditions of extensive alkalinity with a normal pH of more than 10 are extant, it should also be pointed out that extreme temperatures and pressure are also involved. Specifically, the temperatures employed normally range between 350–625° F. and are accompanied by pressure which may exceed 250 p.s.i. Consequently, the coating composition must be capable of enduring a pH in excess of 9, and temperatures in excess of 350° F., for prolonged periods without decomposing. Glass fibers cannot endure such conditions and therefore, the coating employed must function to protect the glass fibers from such conditions.

Within the definition of alkaline and heat resistant compositions, a wide variation is feasible. For example, while a polyvinyl chloride resin is the preferred coating composition, thermosetting resins such as phenol-formaldehyde and epoxy resins and even butyl rubber and neoprene elastomers yield satisfactory results.

The method of coating the fibrous strand also permits broad latitude and conventional contact, applicators and immersion techniques may be employed.

A preferred coating composition and coating method are provided by the following example:

*Example 1*

A polyvinyl chloride plastisol was prepared from the following ingredients.

| Ingredient: | Parts by weight |
|---|---|
| Polyvinyl chloride resin (plastisol grade) | 100.0 |
| Primary plasticizers— | |
|     Butyl isodecyl phthalate | 6.0 |
|     Tri-(2 ethyl hexyl) phosphate | 10.5 |
|     n-Octyl n decyl adipate | 10.5 |
|     Alkyl epoxy stearate | 5.0 |
|     n-Octyl n-decyl phthalate | 15.0 |
| Secondary plasticizers—hydrocarbon petroleum fraction (high aromatic content) | 3.0 |
| Additional ingredients— | |
|     Barium-cadmium laurate (stabilizer) | 3.0 |
|     Aliphatic hydrocarbon diluent | 7.0 |

The plastisol was prepared by initially mixing, in a Ross mixer, 75 parts of the polyvinyl chloride resin, twothirds of the primary plasticizers, the 3 parts of the barium-cadmium laurate stabilizer, and the three parts of secondary plasticizer. As noted, the secondary plasticizer is a hydrocarbon petroleum fraction having a high aromatic content, a molecular weight of 26%, a specific gravity of 0.8899 at 25° C., an open cup flash point of 135° C., an initial boiling point of 508° F., an A.S.T.M. color of 1, S.U.S viscosities of 56 at 100° F. and 35 at 210° F., a pour point of 60° F., an A.P.I. gravity of 27.5, a C.O.C. flash point of 270° F., and an aniline point of 112° F.

The remaining 25 parts of polyvinyl chloride resin were added in two equal increments. One was added after the initial resin was completely wetted out (approximately two minutes), and the second increment was added after the first increment was completely wetted out. After the resin has been completely wetted out, the mixture was mixed for 20 minutes and at all times during the mixing cycle the temperature of the mix was kept below 100° F., by means cooling coils in the Ross mixer.

The remainder of the primary plasticizers was then separately blended and mixed for 15 minutes and the 7 parts of hydrocarbon diluent was then added slowly with 2 minutes of additional mixing. The diluent is an aliphatic hydrocarbon having an A.P.I. gravity of 45.5, an initial boiling point of 320° F., a flash point (T.C.C.) of 105° F., and an aniline point of 112° F.

The main batch and the second batch are the blended together and deaerated.

The described coating is applied to a continuous fibrous glass strand in accordance with the methods and apparatus of U.S. 2,910,383, and the coating is fused in an oven at a temperature of approximately 350° F.

Another suitable coating was prepared from the ingredients of the following example:

*Example 2*

Fibrous glass strands comprising 204 filaments having an average diameter of 0.00036 inch were coated with a phenol-formaldehyde resin which comprised the condensate of 2.36:1 parts phenol to formaldehyde. The resin possessed a specific gravity of 1.218 at 25° C., infinite dilutability, a pH of approximately 7.3 and was reacted in the presence of 10% NaOH (based on the weight of phenol), neutralized with phosphoric acid, and filtered to reduce the potential ash content to 0.3%.

The resin was employed in an aqueous dispersion containing 62.5% by weight of resin solids. Beads of excess resin were formed by adjusting the running speed of the strand during coating, in relation to the viscosity of the coating composition. Specifically, with the above coating composition which has an approximate viscosity of 90 cps. at 25° C., the strand was immersed in the coating composition at a linear speed of 60 feet per minute, and immediately passed through a 10 foot long oven maintained at a temperature of 650° F. The occurrence of laterally projecting resin beads can be controlled by increasing or decreasing the speed of the strand while maintaining the viscosity of the coating material constant.

Such coating compositions may also include such additives as silicone resins or organosiloxane liquids, emulsifiers and the like.

In addition to the polyvinyl chloride and phenolic resins of Examples 1 and 2, suitable strands have also been prepared with coatings of epoxy resins and neoprene, butyl, or acrylonitrile elastomers.

PREPARATION OF THE REINFORCED MATRIX

The reinforcements of the invention are preferably added to the aqueous slurry employed to form the ultimate hydrous calcium silicate structure in order to avoid attrition during processing. In this regard it should be noted that the volume of the hardened, ultimate structure is substantially the same as that of the aqueous slurry, since a rigid framework of hydrous calcium silicate is formed during induration and the water is removed by drying, from the interstices of this framework, to yield a porous or cellular, low density matrix. The principal distinction between hydrous calcium silicates is one of density, and this factor is controlled by the ratio of water employed in the slurry, e.g., the higher the ratio of water, the lower the density.

The nominal density of such products normally varies between 8–25 pounds per cubic foot.

In addition to density variations, the hydrous calcium silicates may also take two general forms which are known as tobermorite ($4CaO \cdot 5SiO_2 \cdot 5H_2O$), and xonotolite ($5CaO \cdot 5SiO_2 \cdot H_2O$).

For present purposes, the discussion will be restricted to a tobermorite type of calcium silicate having a nominal density of 11–12 pounds per cubic foot, although hydrous calcium silicates of other types, and of other densities may be similarly improved by the present invention. The methods of U.S. Patent Re. 23,228 were employed to form a tobermorite type of hydrous calcium silicate from the following ingredients:

| | Parts by weight |
|---|---|
| Quicklime | 35 |
| Asbestos | 15 |
| Silica | 50 |
| Water | 600 |

After a slurry is prepared from the above ingredients and prior to the introduction of the slurry to the molds, the reinforcements are added to the slurry in a quantity of between 0.5–15% by weight. The reinforcements are dispersed throughout the slurry and the admixture is introduced into the mold. The admixture may then be indurated at temperatures in excess of 300° F. It should be noted that the hydrous calcium silicate structures which are reinforced in accordance with the invention are fundamentally prepared by reacting lime and silica, in an approximately equimolar ratio, while maintaining the aqueous phase within the reaction medium, and upon achievement of the reaction, dispelling the aqueous phase to yield a low density structure characterized by voids left by the dispelled aqueous phase. Specifically, the solids content is maintained at no more than 30% by weight, to insure the desired void volume to solids ratio, and the silica is employed in at least an equimolar ratio. The aqueous phase is maintained within the dispersion by means of induration in an autoclave, and once the reaction is accomplished to yield the calcium silicate matrix, the aqueous phase is removed, e.g., by drying, to leave the desired voids and a consequent structure having a low density. Induration and drying may be achieved by one treatment, i.e., maintaining the induration treatment beyond the achievement of the reaction and to the point at which drying is achieved. Alternatively, induration may be accomplishd, and the calcium silicate structure, still containing moisture, may then be treated at lower temperatures until dried. Specifically, the induration may be conducted under autoclaving conditions (600° F., 250 p.s.i.) and maintained until the product is fully dried, or the product may be removed after it has reacted to yield calcium silicate, and the moisture may be removed by oven drying at 300° F. In the former method, induration may be accomplished in a saturated steam atmosphere and the atmosphere may then be elevated to a superheated steam atmosphere, to achieve drying, with the pressure maintained relatively constant throughout. In the second method, induration in a saturated steam atmosphere at high pressure may be followed by drying at atmospheric pressure and a temperature of 300° F.

In a preferred method, the slurry of water, lime and silica with entrained, dispersed reinforcements is indurated at temperatures in excess of 350° F. and under a pressure in excess of 100 p.s.i. for a period adequate to achieve the lime-silica reaction which yields the hydrous calcium silicate. During this phase care is taken to prevent substantial loss of the aqueous phase. Once the reaction is achieved, a drying phase is initiated by maintenance of the temperature, or increased temperatures, e.g. superheated steam, and continued until approximately 70% of the moisture is removed. The temperature is then reduced to between 250 to 350° F., and atmospheric pressure is employed, to substantially dry the calcium silicate.

In regard to the induration phase, it should be noted that this treatment may be varied somewhat in accordance with the coating composition employed. For example, it is conventional to either completely dry the calcium silicate structure in an autoclave by means of superheated steam, or to indurate without drying and then to dry under more moderate conditions. In the autoclave technique, the temperatures within the calcium silicate structure are substantially less than those in the autoclave, so long as some degree of moisture is retained by the structure. For example when the structure retains more than about 30% moisture, the temperature of the structure is in the range of 400–410° F. under a pressure of 250 p.s.i. despite the fact that the temperature within the autoclave may be in excess of 550° F. Consequently, if the coating material tends to decompose at the temperatures of the autoclave, the autoclaving conditions may be maintained only so long as some degree of moisture is retained. The drying process may then be continued in conventional oven-dryers at lower temperatures.

As previously mentioned, an orientation of the discontinuous reinforcing phase within the continuous calcium silicate matrix, is desirable in the case of some structures. For example, in the flat or hemi-cylindrical structures of FIGURES 1 and 2, respectively, fractures are most commonly experienced through the minor dimension 10, 20 of the structures. Typical fractures are depicted 11, 21. In such structures, which have two opposed major surfaces 12 and 22, and a minor dimension 10, 20 or thickness, it is highly beneficial to orient a majority of the reinforcements in a position wherein the longiutdinal axis of the reinforcement is substantially parallel to the opposed major surfaces 12 and 22, and consequently substantially perpendicular to the minor dimension 10 and 20. When such orientation is achieved, the reinforcements tend to span the fractures 11 and 21, and to interconnect the segments which abut the fracture. It is noted that in the flat structure of FIGURE 1, the orientation of the reinforcements may be accurately described as parallel to the major surfaces 12, and perpendicular to the minor dimension 10. However, due to the non-planar or arcuate geometry of the structure of FIGURE 2, the orientation is more properly described as substantially tangential to the major surfaces 22, and substantially perpendicular to any radial plane taken through the minor dimension 20.

Such orientation is illustrated by FIGURES 3 and 4 which represent cross-sectional views taken through planes 3 and 4 of FIGURES 1 and 2. In the case of the flat structure of FIGURE 3 it may be observed that the reinforcing elements 31 are substantially parallel to the major surfaces 12. In addition, in the area of the fracture 11, the reinforcing elements 35 span the fracture and interconnect the segments 36 and 37 which have resulted from fracturing. It should also be noted that while FIGURES 3 and 4 depict a unidirectional orientation in a plurality of parallel planes extending throughout the minor dimension of the structure, such orientation may also exist in a plurality of directions, in the parallel planes. Specifically, the direction of the reinforcements may cover the 360° within each plane. Such multidirectional orientation is not so essential in the case of the hemi-cylindrical structures of FIGURES 2 and 4, since fractures in such structures normally occur in the medial longitudinal region as illustrated by typical fracture 21 in FIGURE 2. Accordingly a unidirectional orientation, perpendicular to the direction of the fracture 21 may suffice for hemi-cylindrical structures. However, in the case of the flat structures of FIGURES 1 and 3, the fractures may occur in any direction, as shown by typical fracture 11 in FIGURE 1. In the case of the fracture 11, it is apparent that a multidirectional orientation is desirable in order to achieve the spanning of the fracture by the reinforcements.

In the case of the hemi-cylinder depicted in cross-section in FIGURE 4, the reinforcing elements 41 are tangential to the major surfaces 22, as is well illustrated by the reinforcing element shown at 43. In addition, the reinforcing elements are substantially perpendicular to any plane through the minor dimension 20, which they may intersect, as is shown by the plane 45 and the reinforcing elements 46 which are intersected by that plane. Again in this case, the fracture 21 is spanned by a number of reinforcing elements.

The achievement of the orientation illustrated by FIGURES 3 and 4 may depend upon the forming and molding technique which is employed. For example, when a press filter molding technique such as that of U.S. 2,699,097 is employed, the reinforcements may merely be admixed with the slurry, and the specified orientation results from the pressing step, or from suction applied to the slurry to dispel the water.

However, when the slurry is merely introduced to a fixed mold, auxiliary means of orientation should be employed.

One method of achieving such orientation is illustrated by FIGURE 5 which depicts a fixed mold for the forming of hemi-cylindrical calcium silicate structures such as those shown in FIGURES 2 and 4. As shown, the mold comprises a female element 51, having an upper surface 52 which is concave and a hemi-cylindrical male core element 53, which is positioned within the upper concavity to form a hemi-cylindrical void 54, into which the slurry to be molded may be introduced. Normally, the slurry is introduced through one of the openings 55 which extend longitudinally along each side of the upper surface of the mold. When the introduction of the slurry is haphazard or uncontrolled, the flow of the slurry through the hemi-cylidrical void is multidirectional within the planes which are substantially tangential to the arcuate surfaces of the structure and results in a partially random orientation of the reinforcements. However, even such uncontrolled flow patterns yield a desirable orientation. Those reinforcing elements which are oriented in a transverse direction are tangential to the convex surface of the male core element, while those which are oriented in a longitudinal direction are parallel to the convex surface. While such orientation yields an improvement in impact resistance, it has been found that in hemi-cylindrical structures, the majority of fractures are longitudinal and medial such as the fracture 21 depicted in FIGURE 2. Consequently, the greater need is for an orientation in which the reinforcing elements are substantially tangential to the convex surface of the male core element. With such orientation, a maximum number of reinforcing elements are available to span a longitudinal fracture.

One method of achieving the described tangential orientation, is by means of the pouring nozzle 61 shown in FIGURE 6. The length of the aperture 62 of the pouring nozzle 61 corresponds to the length of the opening in the mold with which the nozzle is to be employed. For example, if the nozzle of FIGURE 6 were to be utilized with the mold of FIGURE 5, the length of the nozzle aperture 62, would correspond to the length of the mold opening 55. The simultaneous introduction of the reinforcement-slurry admix, throughout the entire length of the mold cavity, and in a single direction of flow, which corresponds to the direction in which the reinforcements should be oriented, yields a matrix with the reinforcements unidirectionally oriented in planes which are tangential to the major, arcuate surfaces of the ultimate hemi-cylindrical structure. This unidirectional introduction and positioning may be farther enhanced when one or both lips 63 of the nozzle aperture 62 are provided with grooves 64, which are parallel to the direction of flow.

Another method of achieving transverse orientation with conventional molds is depicted by FIGURE 7 which depicts a cross-section of a conventional mold such as the mold shown in perspective in FIGURE 5. In normal practice, the slurry is introduced to the mold of FIGURE 5 while the female element 51 and the hemi-cylindrical male core element 53 are positioned in the relationship designed to provide the desired mold cavity. In other words, the slurry is introduced while the core is positioned within the mold and as previously discussed, a somewhat random orientation of the reinforcements entrained in the slurry results. A modification of this pouring method is illustrated by FIGURE 7, in which the total quantity of the slurry 71, with a plurality of reinforcements 72 entrained therein, is placed in the concave cavity 73 of the female mold element 51, while the hemi-cylindrical male core element 53 is removed therefrom. Then, when the male core element 53 is replaced in position in female mold element 51, the slurry 71 is forced to flow in the direction of the arrows 76, and such flow results in the orientation of the reinforcements 72 in a position which is substantially parallel to the direction of flow 76, and substantially tangential to the arcuate surfaces of the male and female mold elements 51 and 53.

PROPERTIES OF REINFORCED HYDROUS CALCIUM SILICATE STRUCTURES

When the reinforcements of the invention are dispersed in a slurry which is productvie of hydrous calcium silicate, and the slurry is molded and indurated to yield a reinforced structure, both the impact resistance and the fragmentation resistance of the structure are substantially increased. Since the actual criterion for an improved product resides in increased fragmentation resistance, without the necessity for fracture resistance, such criteria are hereafter employed to demonstrate and evidence the achievements realized by the present invention. Since the problem experienced was primarily one of fragmentation upon dropping, or similar impact during shipping, a simple test designed to demonstrate such damage, and inventive improvements in respect to such damage, was designed and is hereafter referred to as the "tilt-drop" test. The "tilt-drop" test comprises the standing of the calcium silicate structure "on-end," upright, or vertical, with its major dimension vertical, upon a concrete surface. Adequate pressure is then exerted with the hand upon the uppermost extremity of the structure, to displace it from its balanced position and to allow it to fall under the effects of its own gravity, and strike the concrete surface upon which it stands. In the case of hemi-cylindrical structures, the force is exerted upon the concave face, so that the convex structure contacts the concrete surface upon falling. The impact stress of such a test is aggravated since the medial longitudinal "spine" of the structure experiences the impact, acts as a fulcrum or pivot, and the movement of the structure is about that fulcrum. As a consequence, maximum force is experienced in the two arcuate portions of the structure which are adjacent to the medial longitudinal zone of impact. The "tilt-drop" test is continued until the calcium silicate structure separates into 2 or more fragments, and the numerical value derived, designates the number of times the structure is "tilt-dropped" before such fragmentation is occurred. The occurrence of fractures or cracks is not heeded in the test, since as previously stated, the occurrence of such cracks in the absence of fragmentation, does not significantly impair the utility of the structure.

For the derivation of the subsequent data, hemi-cylindical calcium silicate structures having a length of 36 inches, a nominal thickness of one inch and a nominal inner diameter of 4 inches were employed, and possessed a normal density of 11 pounds per cubic foot. The calcium silicate was of the tobermonite $$(4CaO-5SiO_2 \cdot 5H_2O)$$

type, and was formed from the ingredients which were previously set forth.

The vinyl coated reinforcements employed in the tests comprised two plied strands each comprising 408 filaments having an average diameter of 0.00036 inch, and coated with approximately 50% by weight of the formulation and method of Example 1. The phenolic coated reinforcements were coated with the formulation of Example 2.

Table I demonstrates the improvement derived when vinyl coated reinforcements are added to the calcium silicate matrix with and without orientation. It should be noted that a 166% improvement was realized without orientation, and a 400% improvement resulted when the reinforcements were oriented by means of the method previously discussed and depicted by FIGURE 7.

TABLE I

| Specimens | Reinforcement | | | Average Number of "Tilt-Drops" Sustained Prior to Fragmentation |
|---|---|---|---|---|
| | Percent by weight | Coating | Length, inches | |
| A (Control) | 0 | 0 | 0 | 2.2 |
| B | 5 | Vinyl | 1.5 | 5.8 |
| C (with orientation) | 5 | Vinyl | 1.5 | 11.0 |

Table II indicates the fact that a phenolic coating also yields a similar improvement in fragmentation resistance.

TABLE II

| Specimens | Reinforcement | | | Average Number of "Tilt-Drops" Sustained Prior to Fragmentation |
|---|---|---|---|---|
| | Percent by weight | Coating | Length, inches | |
| D (with orientation) | 5 | Phenolic | 1.5 | 15.0 |

It should be noted that while an improvement of 580% was realized with specimen D, which contained oriented, phenolic coated reinforcements, a portion of this improvement may be attributed to an enhanced condition of mechanical bonding. Specifically, the fibrous glass strands were passed through a solution of phenolic resin which adhered in excessive quantities to the strand and formed droplets of excess resin at intervals upon the strand surface. The thus coated strand was immediately passed through an oven which cured the phenolic coating and transformed the drops of excess resin into hardened, laterally projecting knobs.

It should be noted that while the utility of the present reinforcements has been described principally in relation to hydrous calcium silicate, such reinforcements are also useful in combination with other matrices which are attended by high temperatures and/or alkalinity during their formation or use, e.g. Portland cement.

It is apparent that hydrous calcium silicate structures having improved impact and fragmentation resistance, and methods for the preparation of such structures, are provided by the present invention.

It is also obvious that various changes, alterations and substitutions may be made in the present invention without departing from the spirit of the invention, as is defined by the following claims:

We claim:
1. A reinforced fragmentation resistant structure comprising a continuous phase consisitng essentially of synthesized low density hydrous calcium silicate containing voids in a volume at least equal to the volume of said calcium silicate, and discontinuously dispersed throughout said continuous phase between 0.5 to 15% by weight of a reinforcing phase consisting essentially of a plurality of fibrous glass strands having a length of between 0.5 to 3 inches, said strands each comprising a plurality of substantially parallel glass filaments, and upon said strands a coating consisting essentially of between 15 to 70% by weight of an alkali and heat resistant composition selected from the group consisting of polyvinyl chloride, phenol-formaldehyde resin, neoprene and butyl rubber.

2. A structure as claimed in claim 1 in which said alkali and heat resistant composition is polyvinyl chloride.

3. A structure as claimed in claim 1 in which said coating has lateral projections.

4. A structure as claimed in claim 1 in which said coating is an expanded cellular foam which is expanded in situ during the synthesis of said calcium silicate.

5. A reinforced fragmentation resistant structure comprising a continuous phase consisting essentially of synthesized low density hydrous calcium silicate containing voids in a volume at least equal to the volume of said calcium silicate and having two major opposed surfaces and a minor dimension separating said opposed surfaces, and discontinuously dispersed throughout said continuous phase between 0.5 to 15% by weight of a reinforcing phase consisting essentially of a plurality of fibrous glass strands having a length of between 0.5 to 3 inches, said strands each comprising a plurality of substantially parallel glass filaments, and upon said strands a coating consisting essentially of between 15 to 70% by weight of an alkali and heat resistant composition selected from the group consisting of polyvinyl chloride, phenol-formaldehyde resin, neoprene and butyl rubber, the majority of said strands being perpendicular to said minor dimension.

References Cited by the Examiner

UNITED STATES PATENTS

| | | | |
|---|---|---|---|
| 620,476 | 2/99 | Michell | 161—125 |
| 2,023,204 | 12/35 | Munters et al. | 154—45.1 |
| 2,699,097 | 1/55 | Binkley | 106—120 X |
| 2,717,848 | 9/55 | Jaye | 154—44 |
| 2,802,240 | 8/57 | Thomas | 18—48 |
| 2,888,377 | 5/59 | Allen | 106—120 X |
| 3,025,202 | 3/62 | Morgan et al. | 117—126 |
| 3,045,286 | 7/62 | Harrison | 18—48 |
| 3,062,682 | 11/62 | Morgan et al. | 117—126 |

EARL M. BERGERT, *Primary Examiner.*

MORRIS SUSSMAN, *Examiner.*